(12) United States Patent
Caulfield et al.

(10) Patent No.: US 9,584,577 B2
(45) Date of Patent: Feb. 28, 2017

(54) METHOD FOR ENABLING USE OF HLS AS A COMMON INTERMEDIATE FORMAT

(71) Applicant: Cisco Technology Inc., San Jose, CA (US)

(72) Inventors: Matt Caulfield, Clinton, MA (US); Eric Friedrich, Sommerville, MA (US); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 14/244,165

(22) Filed: Apr. 3, 2014

(65) Prior Publication Data
US 2015/0288736 A1   Oct. 8, 2015

(51) Int. Cl.
*H04L 29/06* (2006.01)

(52) U.S. Cl.
CPC .......... *H04L 65/608* (2013.01); *H04L 65/604* (2013.01); *H04L 65/80* (2013.01)

(58) Field of Classification Search
CPC ..... H04L 65/608; H04L 68/80; H04L 65/604; H04L 65/80; G06F 17/30761; G06F 17/30749; G06F 17/30743
See application file for complete search history.

(56) References Cited

U.S. PATENT DOCUMENTS

| | | | |
|---|---|---|---|
| 2006/0188229 A1* | 8/2006 | Yamagata | G11B 27/105 386/244 |
| 2007/0102764 A1* | 5/2007 | Ando | G11B 20/00086 257/355 |
| 2007/0226623 A1* | 9/2007 | Togashi | G11B 19/025 715/716 |

(Continued)

FOREIGN PATENT DOCUMENTS

| | | |
|---|---|---|
| EP | 2 200 319 A1 | 6/2010 |
| WO | WO 2014/008200 A1 | 1/2014 |

*Primary Examiner* — Uzma Alam
(74) *Attorney, Agent, or Firm* — Samuel M. Katz (57) ABSTRACT

In one embodiment a method, system, and apparatus is described for providing multimedia content from a server to a plurality of media devices, the method including providing a computing device an HTTP Live Streaming (HLS) playlist for playing in an adaptive bitrate client, the playlist including a list of at least two segments, each of the segments having an associated duration field, for each segment in the playlist, assigning a timestamp which is equal to the sum the durations of each previous segment in the playlist, calculating a calculated duration of the playlist by subtracting a time stamp of the first segment in the playlist from the time stamp of the last segment in the playlist, determining a real duration of the playlist by subtracting a first presentation time stamp (PTS) of the first segment in the playlist from the last presentation time stamp (PTS) of the last segment in the playlist, computing a playlist drift by subtracting the calculated duration of the playlist from the real duration of the (Continued)

playlist, determining a correction factor by dividing the playlist drift by the number of segments in the playlist, and calculating a new timestamp for each segment in the playlist by adding the correction factor to the time stamp of the segment. Related methods, systems, and apparatus are also described.

16 Claims, 3 Drawing Sheets

(56) References Cited

U.S. PATENT DOCUMENTS

| | | | |
|---|---|---|---|
| 2008/0077611 A1* | 3/2008 | Yamasaki | G11B 27/031 |
| 2009/0006479 A1* | 1/2009 | Fujita | G06F 17/30053 |
| 2009/0087159 A1* | 4/2009 | Onoda | G11B 20/1217 386/248 |
| 2010/0011407 A1* | 1/2010 | Herlein | H04N 7/165 725/146 |
| 2010/0195974 A1* | 8/2010 | Zheng | H04N 5/76 386/343 |
| 2010/0305726 A1* | 12/2010 | Lu | G06F 3/0481 700/94 |
| 2011/0246885 A1* | 10/2011 | Pantos | H04L 65/4084 715/716 |
| 2011/0264727 A1* | 10/2011 | Keum | H04L 65/4084 709/203 |
| 2011/0271092 A1* | 11/2011 | Brelay | G11B 27/005 713/150 |
| 2012/0109971 A1* | 5/2012 | Jellison, Jr. | G06F 17/30038 707/748 |
| 2012/0151080 A1 | 6/2012 | Brueck et al. | |
| 2012/0284802 A1* | 11/2012 | Hierro | G06F 21/10 726/27 |
| 2012/0303759 A1* | 11/2012 | Adimatyam | H04L 67/306 709/219 |
| 2014/0013376 A1 | 1/2014 | Xu et al. | |
| 2014/0064703 A1* | 3/2014 | Takeuchi | H04N 5/783 386/248 |
| 2014/0082206 A1* | 3/2014 | Samuell | H04L 65/1069 709/227 |
| 2014/0095341 A1* | 4/2014 | Woods | G06Q 30/06 705/26.5 |
| 2014/0180818 A1* | 6/2014 | Mistler | G06Q 30/0259 705/14.57 |
| 2014/0258463 A1* | 9/2014 | Winterrowd | H04L 65/4084 709/219 |
| 2014/0270697 A1* | 9/2014 | Verheem | H04N 21/234309 386/232 |
| 2014/0280781 A1* | 9/2014 | Gregotski | H04L 65/60 709/219 |
| 2014/0344410 A1* | 11/2014 | Saremi | H04L 65/602 709/219 |
| 2014/0380376 A1* | 12/2014 | Schmidt | H04L 65/4084 725/54 |
| 2015/0256861 A1* | 9/2015 | Oyman | H04N 21/2343 725/62 |
| 2015/0263916 A1* | 9/2015 | Phillips | H04L 43/08 709/224 |

* cited by examiner

METHOD FOR ENABLING USE OF HLS AS A COMMON INTERMEDIATE FORMAT

FIELD OF THE INVENTION

The present invention generally relates to adaptive bitrate streaming.

BACKGROUND OF THE INVENTION

Adaptive Bitrate (ABR) Streaming of media over a network from a content distribution network has been widely adopted for media consumption. Various protocols for such streaming have been proposed, and are often associated with various providers of hardware or software. For example, and without limiting the generality of the foregoing, the HTTP Live Streaming (HLS) protocol has been put forth by Apple, and is typically associated with Apple devices, such as, iPhones, iPads, and so forth. Likewise, the HTTP Smooth Streaming (HSS) protocol has been proposed by Microsoft, and is accordingly often associated with Microsoft products, such as Windows Phone and Silverlight. The HTTP Dynamic Streaming (HDS) protocol is associated with Adobe and Adobe products, such as Flash Player and Flash Media Server. MPEG DASH (Dynamic Adaptive Streaming over HTTP, ISO/IEC 23009-1:2012) was put forward by the MPEG standards body as yet another alternative standard adaptive bitrate protocol.

It is appreciated that each of these protocols may be supported on hardware or by software produced by one of these bodies, even though that particular hardware or software may be produced by one particular provider, and the adaptive bitrate format associated with a different provider. By way of example, a device running a Microsoft operating system may be displaying streamed content which is streamed using the HDS protocol of Adobe.

BRIEF DESCRIPTION OF THE DRAWINGS

The present invention will be understood and appreciated more fully from the following detailed description, taken in conjunction with the drawings in which.

The present invention will be understood and appreciated more fully from the following detailed description, taken in conjunction with the appendix in which Appendix A presents an exemplary HLS Master Playlist and HLS Stream Playlist, as well as the corresponding HSS, HDS, and DASH outputs that the HLS Master Playlist and HLS Stream Playlist would be converted to.

DESCRIPTION OF EXAMPLE EMBODIMENTS

Overview

A method and system is described in which a playlist of content items for playing in an adaptive bitrate client is provided. A method for providing multimedia content from a server to a plurality of media devices, the method including providing a computing device an HTTP Live Streaming (HLS) playlist for playing in an adaptive bitrate client, the playlist including a list of at least two segments, each of the segments having an associated duration field, for each segment in the playlist, assigning a timestamp which is equal to the sum the durations of each previous segment in the playlist, calculating a calculated duration of the playlist by subtracting a time stamp of the first segment in the playlist from the time stamp of the last segment in the playlist, determining a real duration of the playlist by subtracting a first presentation time stamp (PTS) of the first segment in the playlist from the last presentation time stamp (PTS) of the last segment in the playlist, computing a playlist drift by subtracting the calculated duration of the playlist from the real duration of the playlist, determining a correction factor by dividing the playlist drift by the number of segments in the playlist, and for each segment in the playlist, calculating a new timestamp by adding the correction factor to the time stamp of the segment. Related methods, systems and apparatus are also described.

Exemplary Embodiment

Figures 1, 2:
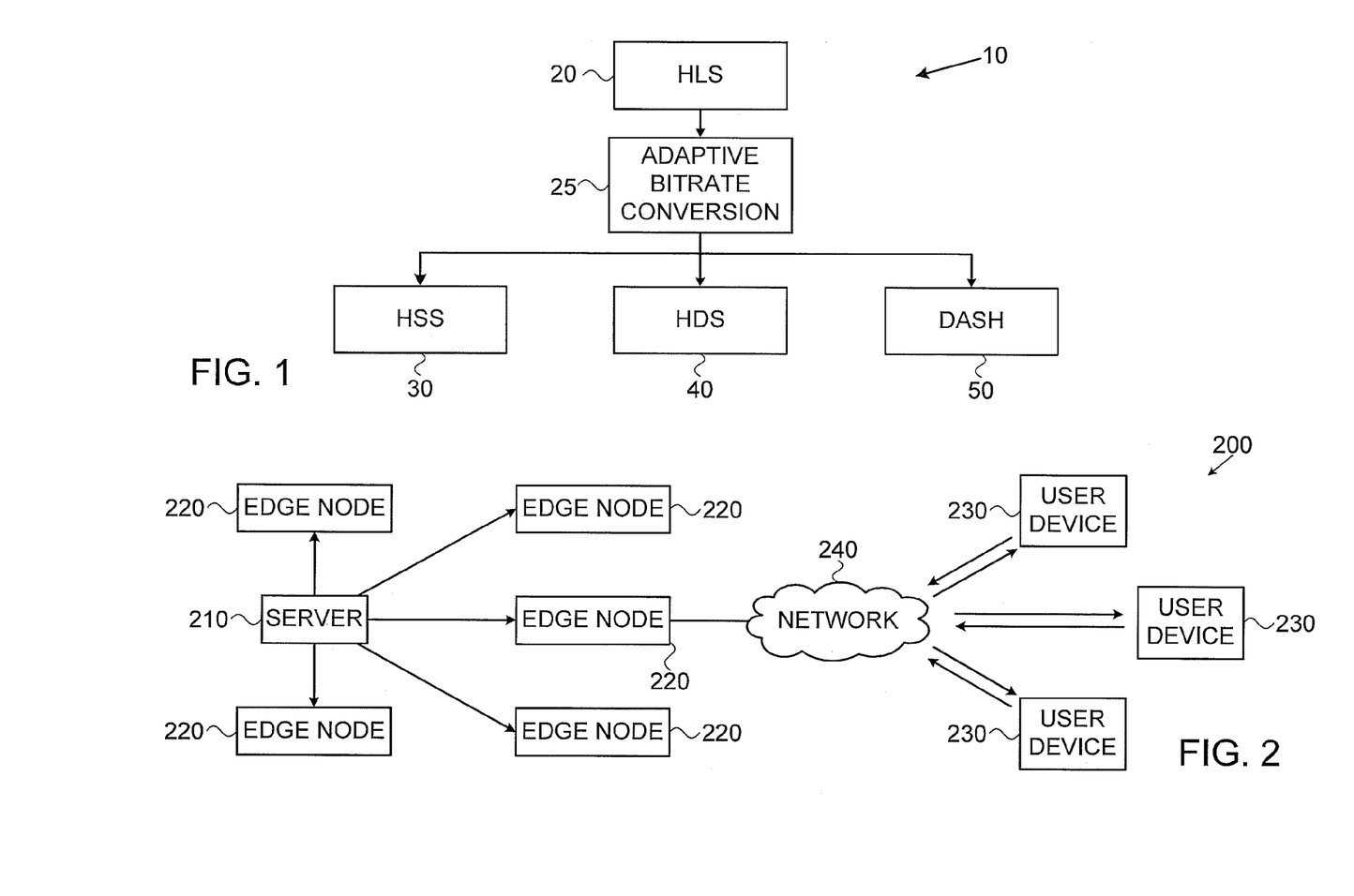
FIG. 1 is a simplified depiction of a system in which a HTTP Live Streaming (HLS) is adapted to one of a number of non-HLS formats.
FIG. 2 is a block diagram drawing of a content distribution network (CDN) in which the system of FIG. 1 may be implemented.

Reference is now made to FIG. 1, which a simplified depiction of a system 10 in which a HTTP Live Streaming (HLS) playlist 20 is adapted to one of a number of non-HLS formats. The HLS playlist 20 is input into an adaptive bitrate converter 25, and a playlist in another format 30, 40, 50 is output.

Given the number of popular formats for adaptive bitrate (ABR) clients, such as, and without limiting the generality of the foregoing, HLS (HTTP Live Streaming) 20, HSS (HTTP Smooth Streaming) 30, HDS (HTTP Dynamic Streaming) 40, and MPEG DASH 50 (ISO/IEC 23009-1: 201), service providers are usually forced to support multiple formats in order to meet the needs of their customers which wish to consume content via adaptive bit rate streaming. By using a Common Intermediate Format (CIF), service providers are given the flexibility to convert to each end-client format as needed, on the fly. Using a CIF enables significant storage, cache, and bandwidth savings for the service provider, or any other user of ABR.

HLS is a popular ABR format, especially in view of the large number of Apple client devices in the market. HLS, if used as a CIF confers significant advantages over any existing proprietary CIF. Aside from gaining the simplicity and flexibility of HLS, service providers can also avoid vendor lock-in to a proprietary CIF by choosing HLS as a CIF. It is appreciated that although HLS is itself a proprietary protocol, it is also well-known, widely supported, and documented. Additionally, HLS segments are typically Transport Stream based, which is a major industry standard.

Most aspects of the conversion from HLS to HSS, HDS, and MPEG DASH are believed by the inventors to be relatively trivial. There is a detailed discussion of the conversion process below. However, one part of the process may be problematic, namely timestamp drift. Timestamp drift refers to the inaccuracy of predicting fragment timestamps for HSS, HDS, and MPEG DASH based solely on the HLS playlists.

Unlike HLS, the other ABR formats (HSS, HDS, and MPEG DASH) each require accurate fragment timestamps in their respective manifest formats. Those skilled in the art will appreciate that HLS, as opposed to HSS, HDS, and MPEG DASH, does not include timestamps in its manifests. Instead, each segment in an HLS playlist is accompanied by its duration. Duration in an HLS manifest may be rounded to the nearest second. By contrast, HSS, HDS, and MPEG DASH respectively use 10 MHZ, 1 KHz, and 90 KHz timescales (it is noted, however, that the timescale of MPEG DASH is configurable). Calculating fragment timestamps based on durations in the HLS playlist typically results in rounding errors after only a few segments.

Those skilled in the art will appreciate that the terms "segment" and "fragment" are used interchangeably in the ABR realm. Typically, the term "segment" is used in discussing HLS and DASH, while the term "fragment" is used in discussions about HSS and HDS. Accordingly, the two terms "fragment" and "segment", in all of their various forms, are understood in the present specification and claims to be referring to the same concept, unless otherwise explicitly noted.

HLS clients avoid timestamp drift related issues by only relying on duration values in the playlist for the purpose of searching through the content and approximating buffer sizes. For real timing information, an HLS client extracts the PTS (presentation time stamp) values of the HLS segments.

While a conversion process could inspect the PTS value of each segment in the playlist (like an HLS client), such a solution would be grossly inefficient. Generating a manifest for HSS, HDS, and MPEG DASH would depend on a disk read for each segment listed in the playlist and would result in a long response time resulting from the conversion process.

It is appreciated that the terms "playlist" and "manifest" are used interchangeably in the ABR realm. Typically, the term "playlist" is used in discussing HLS, while the term "manifest" is used in discussions about HSS, DASH, and HDS. Accordingly, the two terms "playlist" and "manifest", in all of their various forms, are understood in the present specification and claims to be referring to the same thing, unless otherwise explicitly noted.

Alternatively, some HLS playlists include an EXT-X-PROGRAM-DATE-TIME tag which provides a "wall clock" timestamp for each segment in the playlist (i.e. the time at which the segment was added to the playlist in the UTC time zone). However, this tag is optional and is meant to provide an informative mapping between segments and the UTC clock times (as opposed to PCR (program clock reference) or PTS) for the purposes of seeking and displaying, etc.

An exemplary HLS playlist, in its most basic form (typically found as a *.m3u8 file), comprises heading information followed by the tags:

```
# EXTINF:10.0,
   http://example.com/content_item1/fileSegment1
# EXTINF:10.0,
   http://example.com/content_item1/fileSegment2
# EXTINF:10.0,
   http://example.com/content_item2/fileSegment1
```

In the above example, each EXTINF is a record marker that describes the media file identified by the URL that follows it. Each media file URL must be preceded by an EXTINF tag. The EXTINF tag contains a "duration" attribute that is an integer or floating-point number in decimal positional notation that specifies the duration of the media segment in seconds. In the above example, the duration of each of the three segments is 10.0 seconds.

An HSS manifest has a FragmentDuration field for each fragment.

An HDS manifest has a fragmentDuration and a segmentDuration field for each fragment and segment (It is appreciated that HDS includes both segments and fragments, and a single HDS segment may contain one or more fragments).

MPEG DASH has a SegmentTimeline with a segment duration field for each segment, e.g.:

```
<SegmentTimeline>
   <S t ="667333" d="39473889" />
   <S t ="40141222" d="40170555" />
   . . .
   <S t ="7527647777" d="12766111" />
</SegmentTimeline>
```

The content items referred to are typically either video content items (which comprise an accompanying audio track) or audio content items. The content items are typically broken up into segments, conventionally 10 seconds in length (if HLS is used), or 2 seconds in length (for one of the other protocols). It is appreciated that content items may be segmented into segments of other time lengths as well.

Reference is now made to FIG. 2, which is a block diagram drawing of a content distribution network (CDN) 200 in which the system of FIG. 1 may be implemented. As those skilled in the art will appreciate, the CDN 200 is typically a large distributed system of servers deployed in multiple data centers across the Internet. The CDN's 200 purpose is to serve content to end-users with high availability and high performance. It is also appreciated that the present invention may be implemented in other situations where content is available for adaptive bitrate (ABR) downloading and streaming. The CDN 200 is brought here as one example of such an embodiment. Other non-limiting examples of such embodiments might include: a video "headend" where video processing and delivery occurs centrally, rather than being distributed to the edge of a CDN; multicast distribution over a variety of transports including cellular access networks; and an in-home network, where segments could also be transformed from HLS to target format and then distributed over WiFi.

The CDN 200 typically comprises at least one server 210 on which large numbers of content items may be stored and served to end users devices, upon demand. Typically, intermediate servers located close to end-users in the network are in communication with the server 210, and are referred to as "edge node" servers, edge nodes, or edge servers 220. Edge nodes 220 communicate with user devices 230, typically over a network 240.

The method and system in which an HLS playlist is adapted to one of a number of non-HLS formats may be implemented in any of the servers (i.e. the server 210 or one of the edge nodes 220) of the content distribution network 220. Typically, the method and system will be implemented in one of the edge nodes 220, as the edge nodes 220 are close to the user devices 230. Placing the conversion on the edge node maximizes bandwidth and cache savings. CIF is transmitted once to the edge. If CIF is used further up in the CDN, then quadruple the bandwidth and caching is required downstream (i.e. one copy of each file to be streamed must be stored in each of the four varieties of file formats: HLS, HDS, HSS, and DASH). However the method and system be implemented in a different server. Alternatively, the method and system of the present invention may also be implemented at a home gateway or a client device. For ease of discussion and depiction, all further references will be to the edge node 220. Nonetheless, it is understood that the edge node 200 is brought by way of example, and not meant to be limiting.

Figure 3:
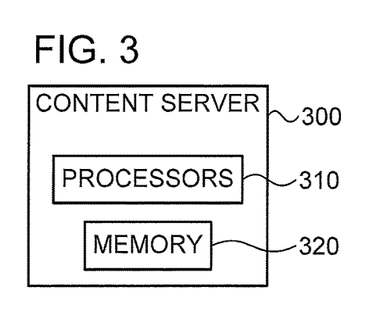
FIG. 3 is a block diagram drawing of a content server for use in the system of FIG. 1.

Reference is now made to FIG. 3, which is a block diagram drawing of a content server 300 for use in the system of FIG. 1. The content server 300 may comprise the one of the edge nodes 220 or the server 210 of FIG. 2. Alternatively, the content server 300 may be any other device operative to serve as an adaptive bitrate content server in order to stream said content to a user device 220 (FIG. 2).

The content server 300 comprises at least one processor 310, and may comprise more than one processor 310. One of the processors 310 may be a special purpose processor operative to perform the adaptation of HLS playlists to one of HSS, HDS and MPEG DASH formats, according to the method described herein. In addition, the content server 300 comprises non-transitory computer-readable storage media (i.e. memory) 320. The memory 320 may store instructions, which at least one of the processors 310 may execute, in order to perform the method of adaptation of HLS playlists to one of HSS, HDS and MPEG DASH formats, described herein. Content server 300 also comprises typical and standard hardware and software components as are known in the art.

Figure 4:
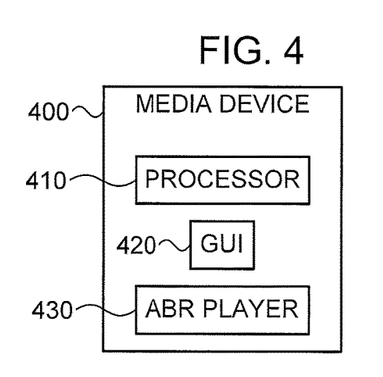
FIG. 4 is a block diagram drawing of a client media device for use in the system of FIG. 1.

Reference is now made to FIG. 4, which is a block diagram drawing of a client media device 400 for use in the system of FIG. 1. The client media device 400 may comprise one of the user devices 230 of FIG. 2. Typical implementations of the client media device 400 include, but are not limited to a tablet device, smartphone, desktop or portable computer, set-top box, Internet-enabled television, media center PC, or any other suitable device, such as is known in the art.

The media device 400 comprises at least one processor 410, a user interface (typically a graphical user interface, GUI) 420, and an ABR player 430. The GUI 420 and the ABR player 430 may comprise a single application, may be two applications which interact with each other, or the GUI may be part of a different application, such as a Web browser. As will be discussed below, with reference to FIG. 5, the GUI 420 enables a user of the media device 400 to interact with the ABR player 430, request content, start, stop, and pause the ABR player 430, and perform other well-known typical user interactions with the ABR player 430.

The media device may comprise more than one processor 410. One of the processors 410 may be a special purpose processor operative to perform the adaptation of HLS playlists to one of HSS, HDS and MPEG DASH formats, according to the method described herein. In addition, the client media device 400 comprises non-transitory computer-readable storage media (i.e. memory—not depicted). The memory may store instructions, which at least one of the processors 410 may execute, in order to perform the method of adaptation of HLS playlists to one of HSS, HDS and MPEG DASH formats, described herein. Client media device 400 also comprises typical and standard hardware and software components as are known in the art.

Figure 5:
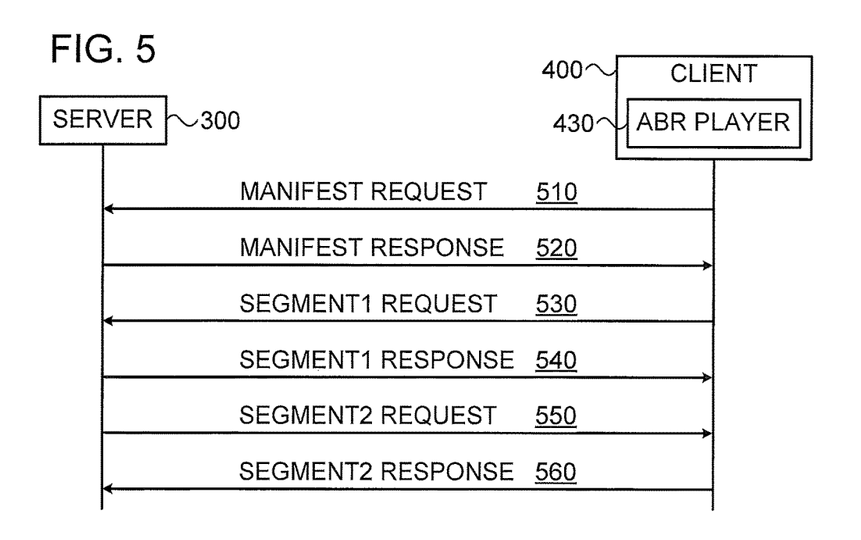
FIG. 5 is a data flow diagram depicting typical communication between the content server of FIG. 3 and the client media device of FIG. 4.

Reference is now additionally made to FIG. 5, which is a data flow diagram depicting typical communication between the content server 300 of FIG. 3 and the client media device 400 of FIG. 4. In a first stage of operation, the user typically actuates the ABR player 430 via the GUI 420 and selects an audio or audio-visual content item for viewing/listening to. The ABR player 430 sends a request to receive a manifest (step 510) of content item segments comprising the audio or audio-visual content item selected by the user from the content server 300.

In response to the manifest request (step 510), the ABR player 430 receives the requested manifest from the content server 300 (step 520). The manifest will be in one of the formats mentioned above: HLS, HDS, HSS, or MPEG DASH. The format of the manifest received by the ABR player 430 will match the format of the request sent to the content server 300 in step 510. Upon receipt of the manifest request, the server 300 accesses a stored playlist for the requested content item. Since the content server 300 stores the requested manifest in HLS format, if the request of step 510 is received in HLS format, the content server 300 will respond by sending the requested manifest in HLS format (step 520). However, if the request of step 510 is received in a non-HLS format (HDS, HSS, or MPEG DASH), the content server 300 will adapt the stored HLS format manifest to a manifest in the appropriate non-HLS format, as described below.

It is appreciated that in some embodiments of the present invention the conversion of the HLS playlist to the non-HLS-playlist may, in fact, occur at the client media device 400. In such a case, the manifest received in step 520 will be an HLS manifest, and the conversion, as described below, will then occur prior to the execution of step 530.

The ABR player 430 will request a first segment (SEGMENT1 REQUEST, step 530), according to the manifest received in step 520, the first segment having an appropriate bandwidth, in accordance to media device capabilities and bandwidth availability on the network 240 (FIG. 2). The content server 300 will respond to the request by sending the requested content segment (step 540). Steps 530 and 540 will repeat as steps 550 and 560 respectively, and so forth, for the following SEGMENT2, and so forth, until the final segment in the manifest.

The following discussion now focuses on the adaptation of the HLS Common Intermediate Format playlist to one of the other, non-HLS formats. It is appreciated that each ABR format has a unique manifest format. The method for converting from the HLS manifest is unique for each format.

For converting HLS to HSS, the manifest is produced by extracting quality levels and timestamps from HLS playlists and extracting all other information from the first segment of each bitrate in the HLS playlists. The HSS fragments themselves are directly translated from the HLS segments by building up video frames for video fragments and audio access units for audio fragments.

For converting HLS to HDS, the manifest is produced by extracting media information, such as, but not limited to bitrates, codecs, languages, and so forth of the actual content item from the HLS playlists. The HDS fragments are directly translated from HLS segments by building up video frames and audio access units, in the same way as HSS.

For converting HLS to MPEG DASH, the media presentation description (MPD), describing segment information (e.g. timing, segment URL, media characteristics, such as video resolution and bitrates) is produced by extracting Adaptation Set information from the HLS playlists as well as from the first segment of each bitrate in the HLS playlists. Each MPEG DASH segment is translated directly from an HLS segment.

Reference is now made to Appendix A, which presents an exemplary HLS Master Playlist and HLS Stream Playlist, as well as the corresponding HSS, HDS, and DASH outputs that the HLS Master Playlist and HLS Stream Playlist would be converted to. It is appreciated that HLS uses a two-tier approach, in which the master playlist is the top-level, so a client would request that first in order to determine which bitrates are available. the master playlist includes URLs for stream playlists. The stream playlists have the actual segment URLs and durations. Both the HLS Master Playlist and HLS Stream Playlist are used for conversion to non-HLS format playlists. The timestamp algorithm is mainly concerned with the stream playlist.

As was noted above, most aspects of the conversion from HLS to HSS, HDS, and MPEG DASH are believed to be trivial. However, one part of the process may be problematic, namely timestamp drift.

One method for calculating timestamps for each segment is to start from 0 and add the value of each EXTINF tag (the segment duration) until the segment in question. The resulting values are referred to as "calculated timestamps". The calculated timestamps suffer from the timestamp drift problem discussed earlier. Rather, in one embodiment of the present invention, timestamp drift is corrected for by first measuring the drift and then adjusting segment durations to correct for it, thus resulting in more accurately calculated timestamps.

The following pseudo-code summarizes the solution:

```
def correct_playlist (playlist):
    timestamp = 0
    for segment in playlist:
        segment.timestamp = timestamp
        timestamp += segment.duration
    if playlist.len < 2 :
        return
    calculated_dur = playlist.last.timestamp -
playlist.first.timestamp
    real_ dur = playlist.last.pts - playlist.first.pts
    drift = real_dur - calculated_dur
    correction = drift / playlist.len
    timestamp = 0
    for segment in playlist:
        segment.timestamp = timestamp
        segment.duration += correction
        timestamp += segment.duration
```

In a first stage of adapting the HLS to the non-HLS format, the timestamp drift value is calculated. The method of assigning timestamps to segments is executed (by starting with a timestamp of 0 and adding up the EXTINF durations for each segment).

The calculated playlist duration is determined by subtracting the calculated timestamp of the first segment from the calculated timestamp of the last segment.

The real PTS values of the first and last segments are read from the first few bytes of the first and last segments themselves. The real playlist duration of the playlist is determined by subtracting the real PTS value of the first segment from the real PTS value of the last segment. The timestamp drift value is determined by subtracting the calculated playlist duration from the real playlist duration.

Next, a correction is applied to the segments in the playlist to account for the drift value, as follows. The timestamp drift value is divided by the number of segments in the playlist and then added to the value of each segment duration. New timestamps are then calculated based on the new duration values. Now there should be no difference between the real duration and the calculated duration, if the calculated duration is recomputed.

While this approach works if each EXTINF value is off by a fixed offset, over a very large number of segments, this may not be the case. In order to accommodate large playlists, an implementation may subdivide the playlist into smaller chunks of N segments and then run the algorithm over each sub-playlist. N is configurable and provides a tradeoff between timestamp accuracy and algorithm efficiency. In situations where latency is important (a client should be able to download the manifest as quickly as possible), a value of N which matches the length of the playlist may be appropriate. In situations like VoD delivery, where latency is less important, more time can be taken and more accuracy can be derived by using a value, for example, N=5.

For playlists with variable segment durations, some segments may be smaller than the rest in the playlist. For example, at an ad-break, the playlist might include two 5-second segments rather than one 10-second segment. Ideally, the 5-second segments would only be corrected by half as much as the 10-second segments. This type of condition can be accounted for by weighting corrections based on the duration reported by the EXTINF tag in the playlist. That is to say, instead of dividing the calculated drift value by the number of segments in the playlist, the drift value is divided by the calculated duration of the playlist. A unique correction to each segment duration would then be applied as follows:

$$newduration = currduration + currduration * correction.$$

That is to say, the new duration (newduration) of the segment would be equal to its current duration (currduration) plus the current duration multiplied by the correction factor.

For maximum efficiency, timestamps calculations only need to be performed for the lowest bitrate since all higher bitrates will share the same timestamps for each segment.

Figure 6:
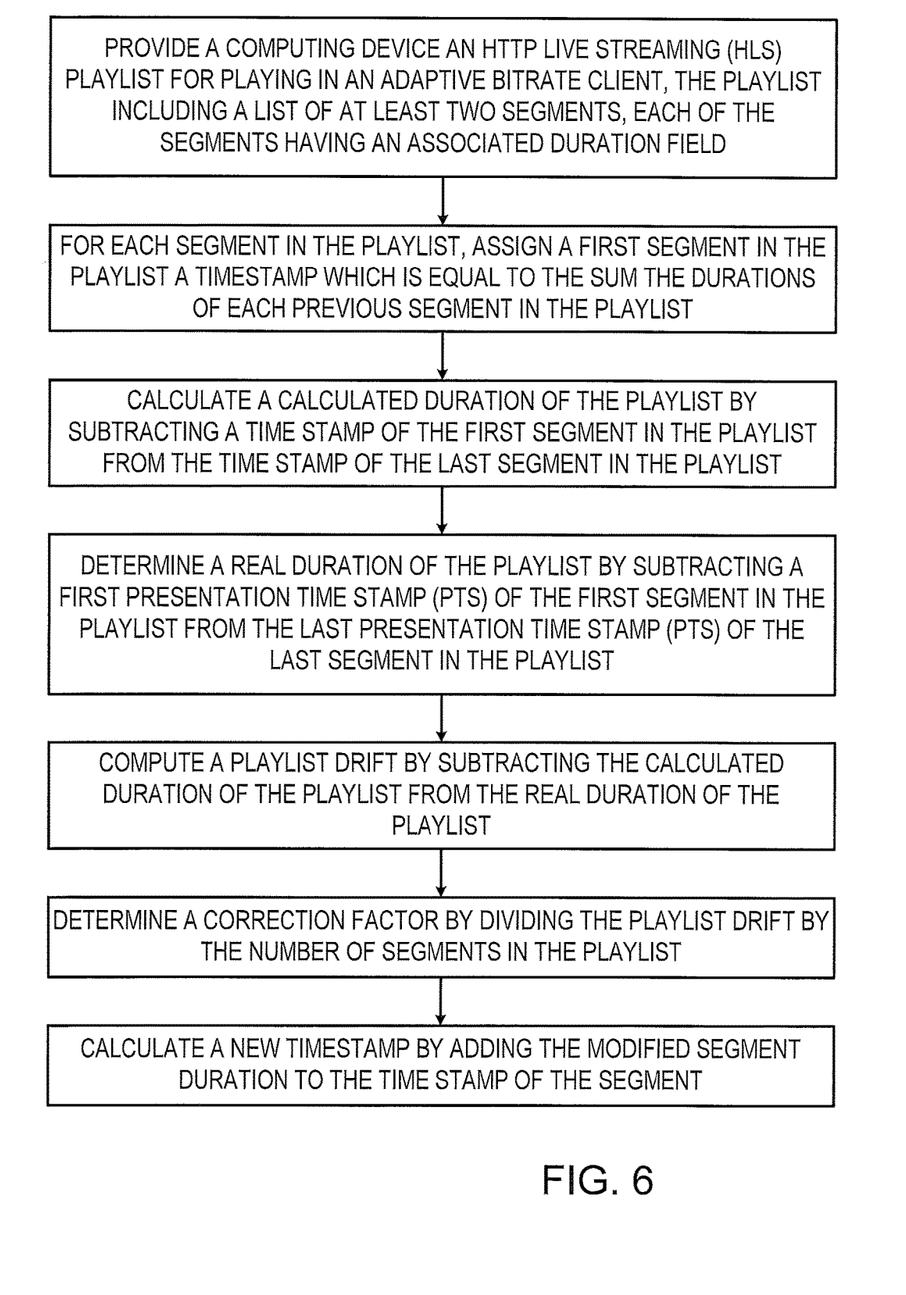
FIG. 6 is a simplified flow chart of a method of operation of the system of FIG. 1.

Reference is now made to FIG. 6, which is a simplified flow chart of a method of operation of the system of FIG. 1. The method of FIG. 6 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

APPENDIX A

HLS MASTER PLAYLIST

EXTM3U
EXT-X-VERSION: 4
EXT-X-STREAM-INF: PROGRAM-ID=1, BANDWIDTH=100
avc.674d40_v4_100.m3u8
EXT-X-STREAM-INF: PROGRAM-ID=1, BANDWIDTH=200
avc.674d40_v4_200.m3u8
EXT-X-STREAM-INF: PROGRAM-ID=1, BANDWIDTH=400
avc.674d40_v4_400.m3u8
EXT-X-I-FRAME-STREAM-INF: PROGRAM-ID = 1, BANDWIDTH=100, URI="iframe_v4_100.m3u8"
EXT-X-I-FRAME-STREAM-INF: PROGRAM-ID= 1, BANDWIDTH=200, URI="iframe_v4_200.m3u8"
EXT-X-I-FRAME-STREAM-INF:PROGRAM-ID = 1, BANDWIDTH=400, URI="iframe_v4_400.m3u8"

HLS STREAM PLAYLIST

EXTM3U
EXT-X-TARGETDURATION: 10
EXT-X-VERSION: 4
EXT-X-MEDIA-SEQUENCE: 1
EXT-X-PLAYLIST-TYPE: EVENT
EXTINF: 10
12345/avc.674d40_0.ts
EXTINF: 10
12345/avc.674d40_900000.ts
EXTINF: 10
12345/avc.674d40_1800000.ts
EXTINF: 10
12345/avc.674d40_2700000.ts
EXTINF: 10
12345/avc.674d40_3600000.ts
EXTINF: 10
12345/avc.674d40_4500000.ts
EXTINF: 10
12345/avc.674d40_5400000.ts
EXTINF: 10
12345/avc.674d40_6300000.ts
EXTINF: 10
12345/avc.674d40_7200000.ts
EXTINF: 10
12345/avc.674d40_8100000.ts
EXTINF: 10
12345/avc.674d40_9000000.ts smooth-HSS PLAYLIST

```
<?xml version="1.0"?>
<SmoothStreamingMedia MajorVersion="2" MinorVersion="2"
IsLive="true" LookaheadCount="0" DVRWindowLength="0"
CanPause="true" CanSeek="true" Duration="0"
TimeScale="10000000">
<StreamIndex Type="video" Name="video_frag_1" SubType=""
Chunks="0" Timescale="10000000"
Url="QualityLevels({bitrate})/Fragments(video_frag_1=(start time})">
<QualityLevel Index="0" Bitrate="100"
CodecPrivateData="00000001SPS00000001PPS" FourCC="AVC1"
MaxWidth="720" MaxHeight="540"/>
<QualityLevel Index="1" Bitrate="200"
CodecPrivateData="00000001SPS00000001PPS" FourCC="AVC1"
MaxWidth="720" MaxHeight="540"/>
<QualityLevel Index="2" Bitrate="400"
CodecPrivateData="00000001SPS00000001PPS" FourCC="AVC1"
MaxWidth="720" MaxHeight="540"/>
<c t="0" d="20000000"/>
<c t="20000000" d="20000000"/>
<c t="40000000" d="20000000"/>
<c t="60000000" d="20000000"/>
<c t="80000000" d="20000000"/>
<c t="100000000" d="20000000"/>
<c t="120000000" d="20000000"/>
<c t="140000000" d="20000000"/>
<c t="160000000" d="20000000"/>
<c t="180000000" d="20000000"/>
```

-continued

APPENDIX A

HLS MASTER PLAYLIST

```
</StreamIndex>
</StreamIndex Type="text" Name="cc_frag_1" Language="en"
SubType="CAPT" Chunks="0" Timescale="10000000"
Url="QualityLevels({bitrate})/Fragments(cc_frag_1={start
time})">
<QualityLevel Index="0" Bitrate="100" FourCC="TTML"/>
<c t="0" d="20000000"/>
<c t="20000000" d="20000000"/>
<c t="40000000" d="20000000"/>
<c t="60000000" d="20000000"/>
<c t="80000000" d="20000000"/>
<c t="100000000" d="20000000"/>
<c t="120000000" d="20000000"/>
<c t="140000000" d="20000000"/>
<c t="160000000" d="20000000"/>
<c t="180000000" d="20000000"/>
<c t="200000000" d="20000000"/>
</StreamIndex>
</SmoothStreamingMedia>
```

HDS PLAYLIST

```
<?xml version="1.0" encoding="utf-8"?>
<manifest xmlns="http://ns.adobe.com/f4m/1.0"
version="3.0">
<id>test</id>
<mimeType>video/x-flv</mimeType>
<streamType>recorded</streamType>
<duration>30.000</duration>
<bootstrapInfo profile="named">
AAAAamFic3QAAAAAAAAFAAAAAPoAAAAAAABzWYAAAAAAAAAAAAAAAAAA
QAAAB1hc3J0AAAAAAAAAABAAAAAQAAADsBAAAAJWFmcnQAAAAAAAD6A
AAAABAAAAAQAAAAAAAAAAAAAH0g= =
</bootstrapInfo>
<media url="stream1" bitrate="100" width="720"
height="540" streamId="stream1" audiocodec="mp4a.4c80"/>
<media url="stream2" bitrate="200" width="720"
height="540" streamId="stream2" audiocodec="mp4a.4c80"/>
<media url="stream3" bitrate="400" width="720"
height="540" streamId="stream3" audiocodec="mp4a.4c80"/>
</manifest>
```

DASH PLAYLIST

```
<MPD availabilityStartTime="2012-04-20T20:34:23"
  minBufferTime="PT5S"
  minimumUpdatePeriod="PT2S"
  profiles="urn:com:cisco:profile:common-format:2013"
  type="dynamic"
  maxSegmentDuration="PT10S"
  mediaPresentationDuration="PT30S"
  xmlns="urn:mpeg:DASH:schema:MPD:2011"
  xmlns: xsi="http://www.w3.org/2001/XMLSchema-
instance"
    xsi: schemaLocation="urn:mpeg:DASH:schema:MPD:2011
DASH-MPD.xsd">
    <Period>
      <BaseURL>http://0.0.0.0:123/</BaseURL>
      <AdaptationSet bitstreamSwitching="true"
        codecs="avc.674d40"
        mimeType="video/mp2t"
        segmentAlignment="false"
        startWithSAP="1">
      <BaseURL>456/</BaseURL>
      <SegmentTemplate timescale="90000"
media="$Bandwidth$/$Time$.ts" startNumber="1">
        <SegmentTimeline>
          <S t="0" d="900000" r="10"/>
        </SegmentTimeline>
      </SegmentTemplate>
      <Representation bandwidth="100" height="540"
id="v1" width="720"/>
      <Representation bandwidth="200" height="540"
id="v2" width="720"/>
      <Representation bandwidth="400" height="540"
id="v3" width="720"/>
```

APPENDIX A

HLS MASTER PLAYLIST

```
    <ContentComponent contentType="video" id="481"/>
    <ContentComponent contentType="audio" id="482"/>
  </AdaptationSet>
 </Period>
</MPD>
```

What is claimed is:

1. A method, implemented in a server, for reducing bandwidth and cache usage when providing multimedia content from the server to a plurality of media devices, the method comprising:
   receiving a request from an adaptive bitrate (ABR) client comprised in one of said plurality of media devices, for a playlist, the request being for a playlist in a non-HTTP Live Streaming (HLS) format;
   providing a computing device in said server an HLS playlist for playing in an adaptive bitrate client, the playlist comprising a list of at least two segments, each of the segments having an associated duration field;
   adapting the HLS playlist to a playlist in the requested non-HLS format by performing the following: for each segment in the playlist, assigning a timestamp which is equal to the sum the durations of each previous segment in the playlist;
   calculating a calculated duration of the playlist by subtracting a time stamp of the first segment in the playlist from the time stamp of the last segment in the playlist;
   determining a real duration of the playlist by subtracting a first presentation time stamp (PTS) of the first segment in the playlist from the last presentation time stamp (PTS) of the last segment in the playlist;
   computing a playlist drift by subtracting the calculated duration of the playlist from the real duration of the playlist;
   determining a correction factor by dividing the playlist drift by the number of segments in the playlist;
   for each segment in the playlist, calculating a new timestamp by adding the correction factor to the time stamp of the segment;
   generating an adapted non-HLS playlist using the segments with the new timestamps;
   sending the adapted non-HLS playlist to the requesting ABR client; and
   generating a non-HLS playlist using the segments with the new timestamps.

2. The method according to claim 1 wherein the non-HLS playlist comprises an HSS playlist.

3. The method according to claim 1 wherein the non-HLS playlist comprises an HDS playlist.

4. The method according to claim 1 wherein the non-HLS playlist comprises an MPEG DASH playlist.

5. The method according to claim 1 wherein the HLS playlist comprises a subset of a larger playlist.

6. The method according to claim 1 wherein the step of determining a correction factor further comprises first dividing the playlist drift by the calculated duration of the playlist, and multiplying the value of the duration field of the segment by the correction factor and adding the result of the multiplying to the duration field of the segment in order to determine a new value of the duration field of the segment.

7. The method according to claim 1 wherein the method is only performed for a lowest bitrate among available bitrates for the adaptive bitrate client, and then assigning the new timestamp to each corresponding segment at each higher bitrate.

8. The method according to claim 1, and further comprising converting the HLS playlist to an HSS playlist by:
   extracting a quality level from the HLS playlist; and
   extracting other information comprised in the first segment of each bitrate in the HLS playlists.

9. The method according to claim 1, and further comprising converting the HLS playlist to an HDS playlist by:
   extracting media information from the HLS playlist; and
   building up video frames and audio access units by:
      extracting a quality level from the HLS playlist; and
      extracting other information comprised in the first segment of each bitrate in the HLS playlists.

10. The method according to claim 9 wherein the media information includes bitrates.

11. The method according to claim 9 wherein the media information includes codecs.

12. The method according to claim 9 wherein the media information includes languages.

13. The method according to claim 1, and further comprising converting the HLS playlist to a DASH playlist by describing segment information by:
   extracting Adaptation Set information from the HLS playlist and the first segment of each bitrate in the HLS playlist; and
   directly translating an HLS segment into a DASH segment.

14. The method according to claim 13 wherein the segment information comprises:
   timing information;
   segment URL;
   video resolution; and
   bitrate information.

15. A system for reducing bandwidth and cache usage when providing multimedia content from a server to a plurality of media devices, the system comprising:
   a computing device in said server;
   a client comprised in one of said plurality of media devices;
   a request receiver for receiving a request from an adaptive bitrate (ABR) client, for a playlist, the request being for a playlist in a non-HTTP Live Streaming (HLS) format;
   an HTTP Live Streaming (HLLS) playlist for playing in an adaptive bitrate client, the playlist comprising a list of at least two segments, each of the segments having an associated duration field;
   an HLS adaptation processor which assigns each segment in the playlist a timestamp which is equal to the sum the durations of each previous segment in the playlist;

a calculator which calculated a calculated duration of the playlist by subtracting a time stamp of the first segment in the playlist from the time stamp of the last segment in the playlist;

a real duration determiner which determines the real duration of the playlist by subtracting a first presentation time stamp (PTS) of the first segment in the playlist from the last presentation time stamp (PTS) of the last segment in the playlist;

a playlist drift processor which computes playlist drift by subtracting the calculated duration of the playlist from the real duration of the playlist;

a correction factor determining processor which determines the correction factor by dividing the playlist drift by the number of segments in the playlist;

a new timestamp calculating processor which calculates a new timestamp for each segment in the playlist by adding the correction factor to the time stamp of the segment;

a processor which generates an adapted non-HLS playlist using the segments with the new timestamps;

a transmitter which sends an adapted non-HLS playlist to the requesting ABR client.

16. A system for reducing bandwidth and cache usage when providing multimedia content from a server to a plurality of media devices, the system comprising:

means for receiving a request from an adaptive bitrate (ABR) client for a playlist, the request being for a playlist in a non-HTTP Live Streaming (HLS) format;

means for adapting the HLS playlist to a playlist in the requested non-HLLS format, the means for adapting the HLS playlist comprising:

means for providing a computing device an HLS playlist for playing in an adaptive bitrate client, the playlist comprising a list of at least two segments, each of the segments having an associated duration field;

means for assigning a timestamp for each segment in the playlist which is equal to the sum the durations of each previous segment in the playlist;

means for calculating a calculated duration of the playlist by subtracting a time stamp of the first segment in the playlist from the time stamp of the last segment in the playlist;

means for determining a real duration of the playlist by subtracting a first presentation time stamp (PTS) of the first segment in the playlist from the last presentation time stamp (PTS) of the last segment in the playlist;

means for computing a playlist drift by subtracting the calculated duration of the playlist from the real duration of the playlist;

means for determining a correction factor by dividing the playlist drift by the number of segments in the playlist;

means for calculating a new timestamp for each segment in the playlist by adding the correction factor to the time stamp of the segment;

generating an adapted non-HLS playlist using the segments with the new timestamps; and means for sending the adapted non-HLS playlist to the requesting ABR client.

\* \* \* \* \*

UNITED STATES PATENT AND TRADEMARK OFFICE
CERTIFICATE OF CORRECTION

PATENT NO.          : 9,584,577 B2  
APPLICATION NO.     : 14/244165  
DATED               : February 28, 2017  
INVENTOR(S)         : Matt Caulfield et al.

Page 1 of 1

It is certified that error appears in the above-identified patent and that said Letters Patent is hereby corrected as shown below:

On the Title Page

Item (72), Address of the 2$^{nd}$ Inventor, Column 1, Line 2, "Sommerville," to read as --Somerville,--.

In the Specification

Column 7, Line 12, "available. the" to read as --available. The--.

Column 9, Lines 53-54, "(sta rt" to read as --{start--.

In the Claims

Column 14, Claim 15, Line 61, "(HLLS)" to read as --(HLS)--.

Column 16, Claim 16, Line 2, "HLLS" to read as --HLS--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*